United States Patent
Iwasaki et al.

(10) Patent No.: US 12,091,555 B2
(45) Date of Patent: Sep. 17, 2024

(54) EXFOLIATED LAYER DISPERSION OF LAYERED COMPOUND, AND TRANSPARENT SUBSTRATE USING SAME

(71) Applicants: UNIVERSITY PUBLIC CORPORATION OSAKA, Osaka (JP); NISSAN CHEMICAL CORPORATION, Tokyo (JP)

(72) Inventors: Tomohiro Iwasaki, Sakai (JP); Hirotake Kitagawa, Sodegaura (JP); Kazutoshi Sekiguchi, Funabashi (JP)

(73) Assignees: UNIVERSITY PUBLIC CORPORATION OSAKA, Osaka (JP); NISSAN CHEMICAL CORPORATION, Tokyo (JP)

( * ) Notice: Subject to any disclaimer, the term of this patent is extended or adjusted under 35 U.S.C. 154(b) by 611 days.

(21) Appl. No.: 17/424,638

(22) PCT Filed: Jan. 21, 2020

(86) PCT No.: PCT/JP2020/001939
§ 371 (c)(1),
(2) Date: Jul. 21, 2021

(87) PCT Pub. No.: WO2020/153352
PCT Pub. Date: Jul. 30, 2020

(65) Prior Publication Data
US 2022/0089880 A1    Mar. 24, 2022

(30) Foreign Application Priority Data

Jan. 21, 2019   (JP) ................. 2019-008012

(51) Int. Cl.
| | | |
|---|---|---|
| C09C 1/30 | (2006.01) | |
| C01B 33/141 | (2006.01) | |
| C09C 3/00 | (2006.01) | |
| C09C 3/04 | (2006.01) | |
| C09C 3/08 | (2006.01) | |
| C09D 1/00 | (2006.01) | |
| C09D 7/40 | (2018.01) | |

(52) U.S. Cl.
CPC ........ *C09C 1/3063* (2013.01); *C01B 33/1417* (2013.01); *C09C 3/006* (2013.01); *C09C 3/041* (2013.01); *C09C 3/08* (2013.01); *C09D 1/00* (2013.01); *C09D 7/70* (2018.01); *C01P 2004/04* (2013.01); *C01P 2004/24* (2013.01); *C01P 2004/54* (2013.01)

(58) Field of Classification Search
CPC ....... C09C 1/3063; C09C 3/006; C09C 3/041; C09C 3/08; C09C 1/28; C09C 3/04; C01B 33/1417; C01B 33/141; C01B 33/44; C09D 1/00; C09D 7/70; C09D 7/45; C09D 7/61; C09D 1/02; C01P 2004/04; C01P 2004/24; C01P 2004/54; C09K 23/18; C09K 23/017; C09K 23/02; C08K 3/346

See application file for complete search history.

(56) References Cited

U.S. PATENT DOCUMENTS

| | | | |
|---|---|---|---|
| 2006/0199889 A1 | 9/2006 | Hunter et al. | |
| 2010/0035039 A1* | 2/2010 | Jing | G02B 1/10 |
| | | | 524/265 |
| 2010/0274036 A1 | 10/2010 | Lin et al. | |
| 2012/0145038 A1 | 6/2012 | Tsuda et al. | |

FOREIGN PATENT DOCUMENTS

| | | | |
|---|---|---|---|
| CN | 106276939 A | 1/2017 | |
| JP | 2001-316551 A | 11/2001 | |
| JP | 2006-083025 A | 3/2006 | |
| JP | 2008-063330 A | 3/2008 | |
| JP | 2014-529319 A | 11/2014 | |
| JP | 2017-105684 A | 6/2017 | |
| WO | 2014/061606 A1 | 4/2014 | |
| WO | WO-2019009193 A1 * | 1/2019 | |

OTHER PUBLICATIONS

WO20190091936 (Year: 2019).*
Apr. 7, 2020 International Search Report issued in International Patent Application No. PCT/JP2020/001939.
Apr. 7, 2020 Written Opinion issued in International Patent Application No. PCT/JP2020/001939.
Bojan A. Marinkovic et al. "Lepidocrocite-Like Ferrititanate Nanosheets and Their Full Exfoliation With Quaternary Ammonium Compounds". Materials & Design, 2015, vol. 85, pp. 197-204.
Fethi Kooli. "Exfoliation Properties of Acid-Activated Montmorillonites and Their Resulting Organoclays". Langmuir, 2009, vol. 25, No. 2, pp. 724-730.
Shimon Osada et al. "Exfoliation of Layered Octosilicate by Simple Cation Exchange With Didecyldimethylammonium Ions". Chemistry Letters, 2013, vol. 42, pp. 80-82.
Nobuyuki Takahashi et al. "Exfoliation of Layered Silicates Through Immobilization of Midazolium Groups". Chemistry of Materials, 2011, vol. 23, pp. 266-273.

(Continued)

*Primary Examiner* — Anthony J Green
(74) *Attorney, Agent, or Firm* — Oliff PLC

(57) ABSTRACT

A stable dispersion of exfoliated layer substances is prepared through interlayer exfoliation of a layered compound. A dispersion including quaternary ammonium ions (A) each having a total carbon atom number of 15 to 45 and one or two $C_{10-20}$ alkyl groups, and an anionic surfactant (B) having an ammonium ion, wherein plate-like particles (C) having an average thickness of 0.7 to 40 nm, an average major-axis length of 100 to 600 nm, an average minor-axis length of 50 to 300 nm, and a ratio of average major-axis length to average minor-axis length of 1.0 to 10.0 are dispersed in a liquid medium, and the plate-like particles (C) in the dispersion have an average particle diameter of 10 to 600 nm as measured by dynamic light scattering, and a transparent substrate using the dispersion.

20 Claims, 1 Drawing Sheet

(56) References Cited

OTHER PUBLICATIONS

G. Borbely et al. "Chemical Characterization, Structural Features, and Thermal Behavior of Sodium and Hydrogen Octosilicate". Clays and Clay Minerals, 1991, vol. 39, No. 5, pp. 490-497.

Sep. 13, 2022 Extended Search Report issued in European Patent Application No. 20745529.6.

Zepeng Zhang et al., "Synergistic effect of cationic and anionic surfactants for the modification of Ca-montmorillonite". Materials Research Bulletin, vol. 48 (2013) pp. 1811-1816.

Sevim Isçi "Intercalation of vermiculite in presence of surfactants". Applied Clay Science, vol. 146 (2017) pp. 7-13.

Nov. 23, 2023 Office Action and Search Report issued in Chinese Patent Application No. 202080010052.0.

Dec. 5, 2023 Office Action issued in Taiwanese Patent Application No. 109102252.

\* cited by examiner

EXFOLIATED LAYER DISPERSION OF LAYERED COMPOUND, AND TRANSPARENT SUBSTRATE USING SAME

TECHNICAL FIELD

The present invention relates to a dispersion of plate-like particles formed of exfoliated layer substances prepared through interlayer exfoliation of a layered compound, a coating film formed from the dispersion, and a transparent substrate formed from the dispersion.

BACKGROUND ART

A layered compound has a crystal structure in which atoms forming the compound are linked in a lateral direction to form plate-like molecules (layers), and the layers are stacked in the remaining one direction. The presence of metal ions between the layers for bonding the layers together leads to formation of strong layer-metal ion-layer bonds, resulting in formation of a layered compound including layers and interlayer spaces. Examples of such a layered compound include clay minerals, manganates, titanates, and niobates. Such a layered compound exhibits intercalation; i.e., the property of reversibly incorporating various ions or molecules between layers.

In the layered compound, interlayer spaces expand depending on the size of ions or molecules incorporated between the layers, or interlayer spaces swell by the intervention of a liquid medium (e.g., water) between the layers, resulting in an increase in interlayer distance by a factor of several times. Infinite swelling of interlayer spaces causes breakage of bonds formed between a layer and a guest substance (e.g., metal ion) and the adjacent layer, resulting in exfoliation of plate-like bodies (plate-like particles) forming the layers and formation of a dispersion system in which the plate-like particles are dispersed in a liquid medium. The plate-like bodies (plate-like particles) are called nanosheets. Methods for preparing a dispersion (sol) of nanosheets have been reported so far.

For example, there has been disclosed an oily sol prepared by applying a mechanical shear force and/or impulsive force to a mixture of silicone oil and an aggregate of an organic modified clay mineral having a layered structure in which a quaternary ammonium compound is intercalated between layers, and subjecting the organic modified clay mineral aggregate to exfoliation treatment, to thereby disperse a layered substance (organic modified clay mineral having a plate-like particulate structure) in the silicone oil (see Patent Document 1).

There has also been disclosed an antifouling anti-reflective coating including a silica-based porous film and an antifouling layer covering the surface of the silica-based porous film, wherein the antifouling layer includes a plurality of nanosheets derived from an inorganic layered compound (see Patent Document 2).

There have also been disclosed a resin composition containing a vinyl alcohol polymer and a swellable layered silicate in which quaternary ammonium ions are introduced between layers, as well as a gas barrier film formed from the resin composition (see Patent Document 3).

There has also been disclosed the production of a dispersion of exfoliated layers by preparation of a layered compound through intercalation of quaternary ammonium ions (e.g., didecyldimethylammonium ions or hexadecyltrimethylammonium ions) between layers, and interlayer exfoliation of the layered compound in a pentane solvent under ultrasonic irradiation (see Non-Patent Document 1)

There has also been disclosed the production of a dispersion of exfoliated layers by intercalation of hexadecyltrimethylammonium ions between layers, and subsequent silane treatment of interlayer spaces with (1-butyl-3-(3-triethoxysilylpropyl)-4,5-dihydroimidazolium chloride for interlayer exfoliation (see Non-Patent Document 2).

There have also been disclosed the synthesis of ilerite, which is a type of a layered compound, and the X-ray diffraction pattern of the synthesized ilerite (see Non-Patent Document 3).

PRIOR ART DOCUMENTS

Patent Documents

Patent Document 1: Japanese Unexamined Patent Application Publication No. 2008-063330 (JP 2008-063330 A)
Patent Document 2: International Publication WO 2014/061606
Patent Document 3: Japanese Unexamined Patent Application Publication No. 2001-316551 (JP 2001-316551 A)

Non-Patent Documents

Non-Patent Document 1: Chemistry Letters, 2013, Vol. 42, pp. 80-82
Non-Patent Document 2: Chemistry of Materials, 2011, Vol. 23, pp. 266-273
Non-Patent Document 3: Clays and Clay Minerals, 1991, Vol. 39(5), pp. 490-497

SUMMARY OF THE INVENTION

Problems to be Solved by the Invention

An object of the present invention is to produce a stable dispersion of exfoliated layer substances by heating an aqueous medium containing a layered compound and an exfoliation agent to thereby prepare exfoliated layer substances, and coating the exfoliated layer substances with a specific anionic surfactant.

Means for Solving the Problems

A first aspect of the present invention is a dispersion comprising quaternary ammonium ions (A) each having a total carbon atom number of 15 to 45 and one or two $C_{10-20}$ alkyl groups, and an anionic surfactant (B) having an ammonium ion, wherein plate-like particles (C) having an average thickness of 0.7 to 40 nm, an average major-axis length of 100 to 600 nm, an average minor-axis length of 50 to 300 nm, and a ratio of average major-axis length to average minor-axis length of 1.0 to 10.0 are dispersed in a liquid medium, and the plate-like particles (C) in the dispersion have an average particle diameter of 10 to 600 nm as measured by dynamic light scattering.

A second aspect of the present invention is the dispersion according to the first aspect, wherein the plate-like particles (C) are exfoliated layer substances prepared through interlayer exfoliation of a layered compound (D).

A third aspect of the present invention is the dispersion according to the second aspect, wherein the layered compound (D) is ilerite.

A fourth aspect of the present invention is the dispersion according to any one of the first to third aspects, wherein the plate-like particles (C) have an Na ion concentration of 0.2% by mass or less.

A fifth aspect of the present invention is the dispersion according to any one of the first to fourth aspects, wherein the dispersion has an Na ion concentration of 100 ppm or less.

A sixth aspect of the present invention is the dispersion according to any one of the first to fifth aspects, wherein the concentration of the quaternary ammonium ions (A) in the dispersion is 10% by mass or less.

A seventh aspect of the present invention is the dispersion according to any one of the first to sixth aspects, wherein the concentration of the anionic surfactant (B) having an ammonium ion in the dispersion is 0.01 to 1% by mass.

An eighth aspect of the present invention is the dispersion according to any one of the first to seventh aspects, wherein the anionic surfactant (B) having an ammonium ion is ammonium dodecyl sulfate.

A ninth aspect of the present invention is the dispersion according to any one of the first to eighth aspects, wherein the concentration of the plate-like particles (C) in the dispersion is 30% by mass or less.

A tenth aspect of the present invention is the dispersion according to any one of the first to ninth aspects, wherein the dispersion exhibits an absorbance of 0.015 or less at an optical path length of 1 cm and a wavelength of 620 nm when the concentration of the plate-like particles (C) is 0.1% by mass.

An eleventh aspect of the present invention is a coating composition comprising the dispersion according to any one of the first to tenth aspects.

A twelfth aspect of the present invention is a coating film comprising the plate-like particles (C) contained in the dispersion according to any one of the first to tenth aspects.

A thirteenth aspect of the present invention is a transparent substrate comprising a base plate and the coating film according to the twelfth aspect disposed on the base plate, wherein the transparent substrate exhibits a total light transmittance of 80% or more when the coating film has a thickness of 500 nm.

A fourteenth aspect of the present invention is a method for producing the dispersion according to any one of the first to tenth aspects, the method comprising the following steps (a) to (e):

a step (a) of producing an aqueous dispersion of a layered compound (D);

a step (b) of adding quaternary ammonium ions (A) each having a total carbon atom number of 15 to 45 and one or two $C_{10-20}$ alkyl groups to the aqueous dispersion produced in the step (a) in an amount corresponding to one to three times the ion-exchange capacity of the layered compound (D), and heating the resultant mixture at 40 to 90° C. for 12 to 48 hours;

a step (c) of adding pure water to the liquid prepared in the step (b), and removing a sodium-ion-containing liquid to the outside of the system so as to achieve a sodium ion concentration of 100 ppm or less in the liquid;

a step (d) of drying the liquid prepared in the step (c), dispersing the dried powder in an aqueous solution of an anionic surfactant (B) having an ammonium ion at a concentration of 0.01 to 1% by mass, and adding ammonia to the resultant dispersion so as to adjust the pH of the dispersion to 9.0 to 12.0; and a step (e) of heating the liquid prepared in the step (d) at 40 to 90° C. for 12 to 48 hours, to thereby produce a dispersion.

A fifteenth aspect of the present invention is the method for producing the dispersion of the layered compound (D) according to the fourteenth aspect, wherein the step (a) is a step (a1) of adding, to an aqueous silicate solution, a pulverized layered compound (D1) in the form of seed particles prepared through pulverization of the layered compound (D), and subjecting the resultant mixture to hydrothermal treatment at 90 to 130° C. for six to 72 hours, to thereby produce an aqueous dispersion containing a fine layered compound (D2) at a concentration of 30% by mass or less.

A sixteenth aspect of the present invention is the production method according to the fifteenth aspect, wherein the pulverized layered compound (D1) has a particle diameter of 30 to 60 nm as measured by dynamic light scattering, and a degree of crystallization of 5 to 15% as determined through powder X-ray diffractometry by the formula [(the sum of the integrated intensities of diffraction peaks at 2θ=6.9 to 8.4°)/(the sum of the integrated intensities of diffraction peaks at 2θ=5 to 40°)]×100.

A seventeenth aspect of the present invention is the production method according to the fifteenth aspect, wherein the fine layered compound (D2) has an average major-axis length of 250 to 750 nm, an average minor-axis length of 200 to 550 nm, and a ratio of average major-axis length to average minor-axis length of 1.0 to 2.0.

An eighteenth aspect of the present invention is the method for producing the dispersion according to the fifteenth aspect, wherein the pulverization of the layered compound (D) in the step (a1) is performed in a dry process with a planetary ball mill.

A nineteenth aspect of the present invention is the method for producing the dispersion according to any one of the fourteenth to eighteenth aspects, wherein the method further comprises a step (f) of replacing the solvent of the produced dispersion with an organic solvent after the step (e).

A twentieth aspect of the present invention is a method for producing the transparent substrate according to the thirteenth aspect, the method comprising applying the dispersion according to any one of the first to tenth aspects to a base plate, and heating the base plate at 40 to 300° C.

Effects of the Invention

According to the present invention, an exfoliation agent (specific quaternary ammonium ions) is intercalated between layers of a layered compound to thereby swell interlayer spaces, and exfoliated layer substances prepared through interlayer exfoliation of the layered compound are subjected to surface treatment with a specific anionic surfactant, to thereby prevent formation of a layered compound through recombination of the exfoliated layer substances. Thus, a dispersion in which the exfoliated layer substances are sufficiently dispersed in a liquid medium can be produced without application of a mechanical shear force or an impulsive force.

In the present invention, since an external force (e.g., a mechanical shear force or an impulsive force caused by ultrasonic irradiation) is not applied during interlayer exfoliation of the layered compound, the exfoliated layer substances are less likely to undergo a change in form, and the exfoliated layer substances can be maintained in the form of plate-like crystals in the resultant dispersion.

The dispersion can be produced with a simple facility through addition of an exfoliation agent and an anionic surfactant and thermal treatment without use of a large-size apparatus such as a shear apparatus.

In the present invention, the layered compound, which serves as a raw material, is previously pulverized by pulverization means (e.g., a ball mill), and the resultant layered compound in the form of seed particles having a small particle diameter is added to an aqueous alkali silicate solution and subjected to hydrothermal treatment, to thereby reproduce a fine layered compound containing silica as a main component and an alkali metal as a guest. The reproduced fine layered compound is used as a raw material for the production of a dispersion containing fine exfoliated layer substances in the form of plate-like particles prepared through interlayer exfoliation of the layered compound.

The dispersion of the present invention, in which fine plate-like particles serve as a dispersoid, maintains high dispersibility, and thus the dispersion exhibits high transparency.

The method of the present invention can produce a highly dispersible dispersion containing fine plate-like particles that maintain their form. Thus, when the dispersion (i.e., nanosheet liquid) is applied onto a base plate to form a coating film, the resultant transparent substrate exhibits high transparency and has small surface irregularities.

In the present invention, the aforementioned plate-like particles are fine plate-like particles maintaining their form. Thus, when the dispersion of the present invention is applied onto a base material, the particles highly adhere to one another on the base material, and the resultant coating film exhibits high airtightness. Therefore, when the dispersion of the present invention is applied onto a plastic or glass base plate to form a coating film, the thus-formed coating film can function as a gas barrier film having a high effect of blocking water vapor or gas.

MODES FOR CARRYING OUT THE INVENTION

Figure 1:
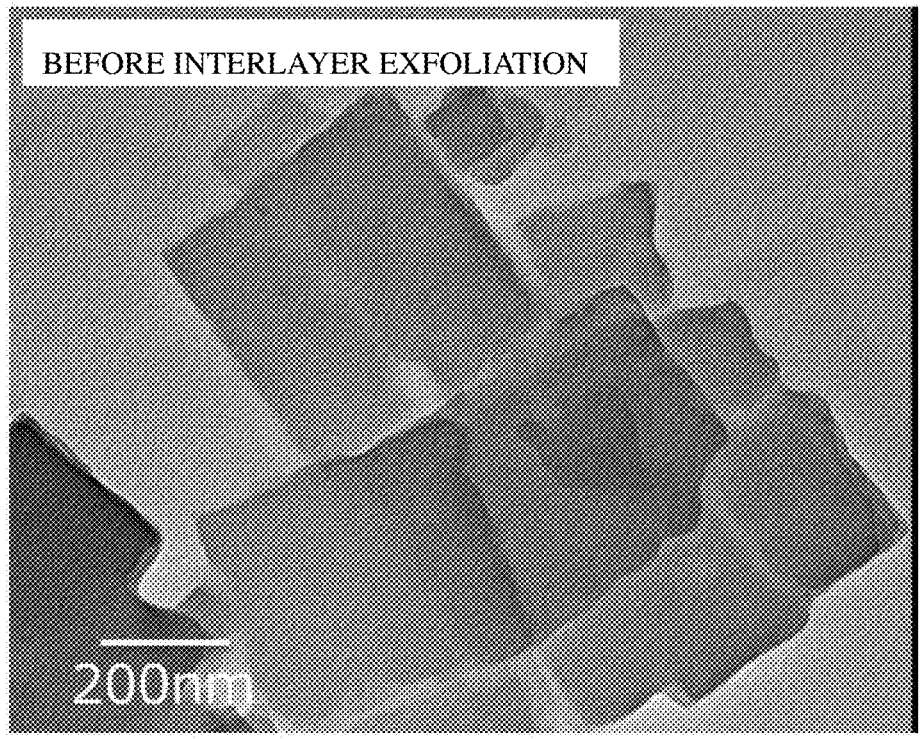
FIG. 1 shows a transmission electron microscope photograph (magnification: 100,000) of ilerite (before interlayer exfoliation) prepared in Synthesis Example 1.

The present invention is directed to a dispersion containing quaternary ammonium ions (A) each having a total carbon atom number of 15 to 45 and one or two $C_{10-20}$ alkyl groups, and an anionic surfactant (B) having an ammonium ion, wherein plate-like particles (C) having an average thickness of 0.7 to 40 nm or 0.7 to 20 nm, an average major-axis length of 100 to 600 nm, an average minor-axis length of 50 to 300 nm, and a ratio of average major-axis length to average minor-axis length of 1.0 to 10.0, or 1.0 to 5.0, or 1.0 to 2.0 are dispersed in a liquid medium, and the plate-like particles (C) in the dispersion have an average particle diameter of 10 to 600 nm, or 10 to 100 nm, or 25 to 45 nm as measured by dynamic light scattering.

In the aforementioned dispersion, the plate-like particles (C) may be dispersed in a dispersion medium containing the liquid medium, the quaternary ammonium ions (A), and the anionic surfactant (B) having an ammonium ion; at least a portion of the plate-like particles (C) may be coated with or adsorbed on either or both of the quaternary ammonium ions (A) and the anionic surfactant (B); or either or both of the quaternary ammonium ions (A) and the anionic surfactant (B) may intervene between the plate-like particles (C).

The plate-like particles (C) preferably have an Na ion concentration of 0.2% by mass or less.

The concentration of the plate-like particles (C) in the aforementioned dispersion may be 30% by mass or less, or 0.01 to 30% by mass, or 0.1 to 30% by mass.

The average major-axis length or average minor-axis length of the plate-like particles (C) can be measured through observation with a transmission electron microscope.

The average thickness of the plate-like particles (C) can be measured through application of the dispersion on a base plate and observation of the coating surface of the base plate with an AFM (atomic force microscope). The observation with the AFM can be performed on a sample prepared by dropwise addition of the dispersion containing the plate-like particles at a concentration of 1% by mass or less onto a mica base plate and subsequent drying. The sample is preferably dried naturally, but may be dried through heating. Alternatively, a sample prepared through application of the dispersion onto a base plate by the Langmuir-Blodgett method may be used for measurement with an AFM.

The average particle diameter of the plate-like particles (C) can be determined as the average particle diameter of the plate-like particles (C) in the dispersion measured by dynamic light scattering. In this case, the concentration (the concentration of the plate-like particles) of the dispersion used for the measurement may be 30% by mass or less.

The plate-like particles (C) may be exfoliated layer substances prepared through interlayer exfoliation of the layered compound (D). Examples of the layered compound (D) include a layered polysilicate, a clay mineral, a manganate, a titanate, and a niobate. Examples of the clay mineral include smectite and vermiculite. Examples of the layered polysilicate include kanemite, makatite, kenyaite, and ilerite.

Among these layered compounds (D), ilerite can be preferably used. Ilerite has a chemical formula of $Na_2O.8SiO_2.nH_2O$, a planar silicate skeleton, and a silanol group between layers. Since ilerite is not naturally present, ilerite is prepared through artificial synthesis. Ilerite can be synthesized by, for example, addition of an aqueous mixture of colloidal silica and sodium hydroxide (the ratio by mole of $SiO_2/Na_2O$ is, for example, 4.0) to a hermetic container, and subsequent hydrothermal reaction at about 90 to 150° C. In general, the layered compound (D) can be produced at a concentration range of 30% by mass or less.

Na ions contained in the aforementioned dispersion are released from the layered compound (interlayer spaces) when Na ions present between layers of the layered compound (layered silicate) are exchanged with the quaternary ammonium ions (A). Thus, a large amount of Na ions are present in the dispersion without any treatment of the dispersion. However, Na ions are discharged to the outside of the system by a method described below. In the dispersion, the concentration of Na ions is preferably reduced for preventing re-formation of the exfoliated layer substances into a layered compound. For example, the concentration of Na ions in the dispersion can be adjusted to 100 ppm or less, for example, 0.1 to 100 ppm or 1 to 100 ppm.

The aforementioned quaternary ammonium ions play a role as an exfoliation agent for expanding interlayer spaces of the layered compound. Thus, each of the quaternary ammonium ions preferably has a bulky organic group, and preferably exhibits high solubility. Therefore, the present invention involves the use of the quaternary ammonium ions (A) each having a total carbon atom number of 15 to 45 and one or two $C_{10-20}$ alkyl groups.

Examples of the quaternary ammonium ions (A) include hexadecyltrimethylammonium ions, didecyldimethylammonium ions, and dimethyldioctadecylammonium. In particular, dimethyldioctadecylammonium is preferably used. The counter ions of the ammonium ions are, for example, chlorine ions or bromine ions.

The concentration of the quaternary ammonium ions (A) in the dispersion can be adjusted to 10% by mass or less, or 0.001 to 10% by mass, or 0.01 to 1.00% by mass.

The anionic surfactant (B) having an ammonium ion is a compound having a hydrophobic group and a hydrophilic group wherein the hydrophilic group is formed of a pair of an anion and an ammonium ion. Basically, the anionic surfactant (B) is preferably a compound containing neither sodium ion nor potassium ion. The anionic surfactant (B) having an ammonium ion is preferably, for example, a compound containing a relatively long-chain alkyl group having a carbon atom number of about 8 to 12 as a hydrophobic group, and is preferably a compound containing no aromatic ring.

Examples of the anionic surfactant (B) having an ammonium ion include ammonium octanoate, ammonium decanoate, ammonium laurate, ammonium stearate, ammonium hexanesulfonate, ammonium octanesulfonate, ammonium decanesulfonate, ammonium dodecanesulfonate, ammonium lauryl sulfate (ammonium dodecyl sulfate), ammonium myristyl sulfate, ammonium lauryl phosphate, and ammonium tripolyphosphate. Of these, ammonium lauryl sulfate (ammonium dodecyl sulfate) is preferably used.

The concentration of the anionic surfactant (B) having an ammonium ion in the dispersion can be adjusted to 0.01 to 1% by mass.

In the present invention, the anionic surfactant (B) having an ammonium ion is used as an essential component. No addition of the anionic surfactant (B) having an ammonium ion, or the use of an anionic surfactant having a sodium ion instead of an ammonium ion or an anionic surfactant having a potassium ion may cause a problem in that interlayer exfoliation does not proceed, or exfoliated layer substances prepared through interlayer exfoliation are likely to re-form a layered structure, resulting in deterioration of the transparency of the dispersion (i.e., no reduction in the absorbance of the dispersion).

The dispersion of the present invention is characterized by its high transparency. For example, the dispersion exhibits an absorbance of 0.1 or less, in particular, 0.015 or less at an optical path length of 1 cm and a wavelength of 620 nm when the concentration of the plate-like particles is 0.1% by mass.

In the dispersion of the present invention, the dispersion medium (liquid medium) of the plate-like particles (C) may be an aqueous medium such as water, or may be an organic solvent. When the dispersion of the present invention is produced, the aqueous medium can be replaced with the organic solvent. The solvent replacement can be performed through evaporation or ultrafiltration.

Examples of the aforementioned organic solvent include methanol, ethanol, isopropanol, butanol, diacetone alcohol, methylcellosolve acetate, ethylcellosolve acetate, propylene glycol, propylene glycol monomethyl ether, propylene glycol monoethyl ether, methyl isobutyl carbinol, propylene glycol monobutyl ether, propylene glycol monomethyl ether acetate, propylene glycol monoethyl ether acetate, propylene glycol monopropyl ether acetate, propylene glycol monobutyl ether acetate, toluene, xylene, methyl ethyl ketone, cyclopentanone, cyclohexanone, ethyl 2-hydroxypropionate, ethyl 2-hydroxy-2-methylpropionate, ethyl ethoxyacetate, ethyl hydroxyacetate, methyl 2-hydroxy-3-methylbutanoate, methyl 3-methoxypropinoate, ethyl 3-methoxypropionate, ethyl 3-ethoxypropionate, methyl 3-ethoxypropionate, methyl pyruvate, ethyl pyruvate, ethylene glycol monomethyl ether, ethylene glycol monoethyl ether, ethylene glycol monopropyl ether, ethylene glycol monobutyl ether, ethylene glycol monomethyl ether acetate, ethylene glycol monoethyl ether acetate, ethylene glycol monopropyl ether acetate, ethylene glycol monobutyl ether acetate, diethylene glycol dimethyl ether, diethylene glycol diethyl ether, diethylene glycol dipropyl ether, diethylene glycol dibutyl ether, propylene glycol monomethyl ether, propylene glycol dimethyl ether, propylene glycol diethyl ether, propylene glycol dipropyl ether, propylene glycol dibutyl ether, ethyl lactate, propyl lactate, isopropyl lactate, butyl lactate, isobutyl lactate, methyl formate, ethyl formate, propyl formate, isopropyl formate, butyl formate, isobutyl formate, amyl formate, isoamyl formate, methyl acetate, ethyl acetate, amyl acetate, isoamyl acetate, hexyl acetate, methyl propionate, ethyl propionate, propyl propionate, isopropyl propionate, butyl propionate, isobutyl propionate, methyl butyrate, ethyl butyrate, propyl butyrate, isopropyl butyrate, butyl butyrate, isobutyl butyrate, methyl 3-methoxy-2-methylpropionate, methyl 2-hydroxy-3-methybutyrate, ethyl methoxyacetate, 3-methoxybutyl acetate, 3-methoxypropyl acetate, 3-methyl-3-methoxybutyl acetate, 3-methyl-3-methoxybutyl propionate, 3-methyl-3-methoxybutyl butyrate, methyl acetoacetate, methyl propyl ketone, methyl butyl ketone, 2-heptanone, 3-heptanone, 4-heptanone, N,N-dimethylformamide, N-methylacetamide, N,N-dimethylacetamide, N-methyl-2-pyrrolidone, 4-methyl-2-pentanol, and γ-butyrolactone. These solvents may be used alone or in combination of two or more species.

In the present invention, the plate-like particles (C) may be coated with a silane compound. When the particles are coated with a silane compound, the gas permeability of a film formed from the dispersion can be controlled. The silane compound may be at least one selected from silane compounds of the following Formulae (1) and (2). The silane compound may be a hydrolysis condensate of such a compound.

$$R^1{}_a Si(R^2)_{4-a} \quad \text{Formula (1)}$$

$$[R^3{}_b Si(R^4)_{3-b}]_2 Y_c \quad \text{Formula (2)}$$

In Formula (1), $R^1$ is an acryloxy group, a methacryloxy group, an aryl group, an alkyl group, an alkenyl group, a glycidoxy group, a $C_{1-10}$ alkyl group containing such a functional group, or an organic group having an epoxy group, an acryloyl group, a methacryloyl group, a mercapto group, or a cyano group, and is bonded to the Si atom via an Si—C bond; and a is an integer of 1 to 3.

$R^2$ is a hydrolyzable group containing an alkoxy group, an aryloxy group, an acyloxy group, or a halogen group. At least one $R^2$ (hydrolyzable group) forms an M-O—Si bond on the surfaces of the plate-like particles (C). When the plate-like particles are derived from ilerite, M is an Si atom contained in ilerite.

In Formula (2), $R^3$ is an alkyl group and is bonded to the silicon atom via an Si—C bond, and $R^4$ is hydrolyzable group containing an alkoxy group, an acyloxy group, or a halogen group. At least one $R^4$ (hydrolyzable group) forms an M-O—Si bond on the surfaces of the plate-like particles (C). When the plate-like particles are derived from ilerite, M is an Si atom contained in ilerite. Y is a single bond, an alkylene group, an arylene group, an NH group, or an oxygen atom; b is an integer of 0 to 3; and c is an integer of 0 or 1.

The aforementioned alkyl group is a linear or branched alkyl group having a carbon atom number of 1 to 10. Examples of the alkyl group include methyl group, ethyl group, n-propyl group, i-propyl group, n-butyl group, i-butyl group, s-butyl group, t-butyl group, n-pentyl group, 1-methyl-n-butyl group, 2-methyl-n-butyl group, 3-methyl-n-butyl group, 1,1-dimethyl-n-propyl group, 1,2-dimethyl-n-propyl group, 2,2-dimethyl-n-propyl group, 1-ethyl-n-propyl group, n-hexyl group, 1-methyl-n-pentyl group, 2-methyl-n-pentyl group, 3-methyl-n-pentyl group, 4-methyl-n-pentyl group, 1,1-dimethyl-n-butyl group, 1,2-dimethyl-n-butyl group, 1,3-dimethyl-n-butyl group, 2,2-dimethyl-n-butyl group, 2,3-dimethyl-n-butyl group, 3,3-dimethyl-n-butyl group, 1-ethyl-n-butyl group, 2-ethyl-n-butyl group, 1,1,2-trimethyl-n-propyl group, 1,2,2-trimethyl-n-propyl group, 1-ethyl-1-methyl-n-propyl group, and 1-ethyl-2-methyl-n-propyl group.

The aforementioned alkyl group may be a cyclic alkyl group. Examples of cyclic alkyl groups having a carbon atom number of 3 to 10 include cyclopropyl group, cyclobutyl group, 1-methyl-cyclopropyl group, 2-methyl-cyclopropyl group, cyclopentyl group, 1-methyl-cyclobutyl group, 2-methyl-cyclobutyl group, 3-methyl-cyclobutyl group, 1,2-dimethyl-cyclopropyl group, 2,3-dimethyl-cyclopropyl group, 1-ethyl-cyclopropyl group, 2-ethyl-cyclopropyl group, cyclohexyl group, 1-methyl-cyclopentyl group, 2-methyl-cyclopentyl group, 3-methyl-cyclopentyl group, 1-ethyl-cyclobutyl group, 2-ethyl-cyclobutyl group, 3-ethyl-cyclobutyl group, 1,2-dimethyl-cyclobutyl group, 1,3-dimethyl-cyclobutyl group, 2,2-dimethyl-cyclobutyl group, 2,3-dimethyl-cyclobutyl group, 2,4-dimethyl-cyclobutyl group, 3,3-dimethyl-cyclobutyl group, 1-n-propyl-cyclopropyl group, 2-n-propyl-cyclopropyl group, 1-i-propyl-cyclopropyl group, 2-i-propyl-cyclopropyl group, 1,2,2-trimethyl-cyclopropyl group, 1,2,3-trimethyl-cyclopropyl group, 2,2,3-trimethyl-cyclopropyl group, 1-ethyl-2-methyl-cyclopropyl group, 2-ethyl-1-methyl-cyclopropyl group, 2-ethyl-2-methyl-cyclopropyl group, and 2-ethyl-3-methyl-cyclopropyl group.

The alkylene group may be an alkylene group derived from any of the aforementioned alkyl groups. The alkylene group is, for example, a methylene group derived from a methyl group, an ethylene group derived from an ethyl group, or a propylene group derived form a propyl group.

Examples of the alkenyl group include $C_{2-10}$ alkenyl groups, such as ethenyl group (vinyl group), 1-propenyl group, 2-propenyl group, 1-methyl-1-ethenyl group, 1-butenyl group, 2-butenyl group, 3-butenyl group, 2-methyl-1-propenyl group, 2-methyl-2-propenyl group, 1-ethylethenyl group, 1-methyl-1-propenyl group, 1-methyl-2-propenyl group, 1-pentenyl group, 2-pentenyl group, 3-pentenyl group, 4-pentenyl group, 1-n-propylethenyl group, 1-methyl-1-butenyl group, 1-methyl-2-butenyl group, 1-methyl-3-butenyl group, 2-ethyl-2-propenyl group, 2-methyl-1-butenyl group, 2-methyl-2-butenyl group, 2-methyl-3-butenyl group, 3-methyl-1-butenyl group, 3-methyl-2-butenyl group, 3-methyl-3-butenyl group, 1,1-dimethyl-2-propenyl group, 1-i-propylethenyl group, 1,2-dimethyl-1-propenyl group, 1,2-dimethyl-2-propenyl group, 1-cyclopentenyl group, 2-cyclopentenyl group, 3-cyclopentenyl group, 1-hexenyl group, 2-hexenyl group, 3-hexenyl group, 4-hexenyl group, 5-hexenyl group, 1-methyl-1-pentenyl group, 1-methyl-2-pentenyl group, 1-methyl-3-pentenyl group, 1-methyl-4-pentenyl group, 1-n-butylethenyl group, 2-methyl-1-pentenyl group, 2-methyl-2-pentenyl group, 2-methyl-3-pentenyl group, 2-methyl-4-pentenyl group, 2-n-propyl-2-propenyl group, 3-methyl-1-pentenyl group, 3-methyl-2-pentenyl group, 3-methyl-3-pentenyl group, 3-methyl-4-pentenyl group, 3-ethyl-3-butenyl group, 4-methyl-1-pentenyl group, 4-methyl-2-pentenyl group, 4-methyl-3-pentenyl group, 4-methyl-4-pentenyl group, 1,1-dimethyl-2-butenyl group, 1,1-dimethyl-3-butenyl group, 1,2-dimethyl-1-butenyl group, 1,2-dimethyl-2-butenyl group, 1,2-dimethyl-3-butenyl group, 1-methyl-2-ethyl-2-propenyl group, 1-s-butylethenyl group, 1,3-dimethyl-1-butenyl group, 1,3-dimethyl-2-butenyl group, 1,3-dimethyl-3-butenyl group, 1-i-butylethenyl group, 2,2-dimethyl-3-butenyl group, 2,3-dimethyl-1-butenyl group, 2,3-dimethyl-2-butenyl group, 2,3-dimethyl-3-butenyl group, 2-i-propyl-2-propenyl group, 3,3-dimethyl-1-butenyl group, 1-ethyl-1-butenyl group, 1-ethyl-2-butenyl group, 1-ethyl-3-butenyl group, 1-n-propyl-1-propenyl group, 1-n-propyl-2-propenyl group, 2-ethyl-1-butenyl group, 2-ethyl-2-butenyl group, 2-ethyl-3-butenyl group, 1,1,2-trimethyl-2-propenyl group, 1-t-butylethenyl group, 1-methyl-1-ethyl-2-propenyl group, 1-ethyl-2-methyl-1-propenyl group, 1-ethyl-2-methyl-2-propenyl group, 1-i-propyl-1-propenyl group, 1-i-propyl-2-propenyl group, 1-methyl-2-cyclopentenyl group, 1-methyl-3-cyclopentenyl group, 2-methyl-1-cyclopentenyl group, 2-methyl-2-cyclopentenyl group, 2-methyl-3-cyclopentenyl group, 2-methyl-4-cyclopentenyl group, 2-methyl-5-cyclopentenyl group, 2-methylene-cyclopentyl group, 3-methyl-1-cyclopentenyl group, 3-methyl-2-cyclopentenyl group, 3-methyl-3-cyclopentenyl group, 3-methyl-4-cyclopentenyl group, 3-methyl-5-cyclopentenyl group, 3-methylene-cyclopentyl group, 1-cyclohexenyl group, 2-cyclohexenyl group, and 3-cyclohexenyl group.

Examples of the aryl group include $C_{6-20}$ aryl groups, such as phenyl group, o-methylphenyl group, m-methylphenyl group, p-methylphenyl group, o-chlorophenyl group, m-chlorophenyl group, p-chlorophenyl group, o-fluorophenyl group, p-mercaptophenyl group, o-methoxyphenyl group, p-methoxyphenyl group, p-aminophenyl group, p-cyanophenyl group, α-naphthyl group, β-naphthyl group, o-biphenylyl group, m-biphenylyl group, p-biphenylyl group, 1-anthryl group, 2-anthryl group, 9-anthryl group, 1-phenanthryl group, 2-phenanthryl group, 3-phenanthryl group, 4-phenanthryl group, and 9-phenanthryl group.

The arylene group may be an arylene group derived from any of the aforementioned aryl groups.

Examples of the organic group having an epoxy group include glycidoxymethyl group, glycidoxyethyl group, glycidoxypropyl group, glycidoxybutyl group, and epoxycyclohexyl group.

Examples of the organic group having an acryloyl group include acryloylmethyl group, acryloylethyl group, and acryloylpropyl group.

Examples of the organic group having a methacryloyl group include methacryloylmethyl group, methacryloylethyl group, and methacryloylpropyl group.

Examples of the organic group having a mercapto group include ethylmercapto group, butylmercapto group, hexylmercapto group, and octylmercapto group.

Examples of the organic group having a cyano group include cyanoethyl group and cyanopropyl group.

The alkoxy group is, for example, a $C_{1-10}$ alkoxy group. Specific examples of the alkoxy group include alkoxy groups having a linear, branched, or cyclic alkyl moiety having a carbon atom number of 1 to 10, such as methoxy group, ethoxy group, n-propoxy group, i-propoxy group, n-butoxy group, i-butoxy group, s-butoxy group, t-butoxy group, n-pentyloxy group, 1-methyl-n-butoxy group, 2-methyl-n-butoxy group, 3-methyl-n-butoxy group, 1,1-dimethyl-n-propoxy group, 1,2-dimethyl-n-propoxy group, 2,2-dimethyl-n-propoxy group, 1-ethyl-n-propoxy group, n-hexyloxy group, 1-methyl-n-pentyloxy group, 2-methyl-n-pentyloxy group, 3-methyl-n-pentyloxy group, 4-methyl-n-pentyloxy group, 1,1-dimethyl-n-butoxy group, 1,2-dimethyl-n-butoxy group, 1,3-dimethyl-n-butoxy group, 2,2-dimethyl-n-butoxy group, 2,3-dimethyl-n-butoxy group, 3,3-dimethyl-n-butoxy group, 1-ethyl-n-butoxy group, 2-ethyl-n-butoxy group, 1,1,2-trimethyl-n-propoxy group, 1,2,2-trimethyl-n-propoxy group, 1-ethyl-1-methyl-n-propoxy group, and 1-ethyl-2-methyl-n-propoxy group; and cyclic alkoxy groups, such as cyclopropoxy group, cyclobutoxy group, 1-methyl-cyclopropoxy group, 2-methyl-cyclopropoxy group, cyclopentyloxy group, 1-methyl-cyclobutoxy group, 2-methyl-cyclobutoxy group, 3-methyl-cyclobutoxy group, 1,2-dimethyl-cyclopropoxy group, 2,3-dimethyl-cyclopropoxy group, 1-ethyl-cyclopropoxy group, 2-ethyl-cyclopropoxy group, cyclohexyloxy group, 1-methyl-cyclopentyloxy group, 2-methyl-cyclopentyloxy group, 3-methyl-cyclopentyloxy group, 1-ethyl-cyclobutoxy group, 2-ethyl-cyclobutoxy group, 3-ethyl-cyclobutoxy group, 1,2-dimethyl-cyclobutoxy group, 1,3-dimethyl-cyclobutoxy group, 2,2-dimethyl-cyclobutoxy group, 2,3-dimethyl-cyclobutoxy group, 2,4-dimethyl-cyclobutoxy group, 3,3-dimethyl-cyclobutoxy group, 1-n-propyl-cyclopropoxy group, 2-n-propyl-cyclopropoxy group, 1-i-propyl-cyclopropoxy group, 2-i-propyl-cyclopropoxy group, 1,2,2-trimethyl-cyclopropoxy group, 1,2,3-trimethyl-cyclopropoxy group, 2,2,3-trimethyl-cyclopropoxy group, 1-ethyl-2-methyl-cyclopropoxy group, 2-ethyl-1-methyl-cyclopropoxy group, 2-ethyl-2-methyl-cyclopropoxy group, and 2-ethyl-3-methyl-cyclopropoxy group.

Examples of the aryloxy group include phenoxy group, benzyloxy group, and phenethyloxy group.

Examples of the acyloxy group include $C_{2-20}$ acyloxy groups, such as methylcarbonyloxy group (acetoxy group), ethylcarbonyloxy group, n-propylcarbonyloxy group, i-propylcarbonyloxy group, n-butylcarbonyloxy group, i-butylcarbonyloxy group, s-butylcarbonyloxy group, t-butylcarbonyloxy group, n-pentylcarbonyloxy group, 1-methyl-n-butylcarbonyloxy group, 2-methyl-n-butylcarbonyloxy group, 3-methyl-n-butylcarbonyloxy group, 1,1-dimethyl-n-propylcarbonyloxy group, 1,2-dimethyl-n-propylcarbonyloxy group, 2,2-dimethyl-n-propylcarbonyloxy group, 1-ethyl-n-propylcarbonyloxy group, n-hexylcarbonyloxy group, 1-methyl-n-pentylcarbonyloxy group, 2-methyl-n-pentylcarbonyloxy group, 3-methyl-n-pentylcarbonyloxy group, 4-methyl-n-pentylcarbonyloxy group, 1,1-dimethyl-n-butylcarbonyloxy group, 1,2-dimethyl-n-butylcarbonyloxy group, 1,3-dimethyl-n-butylcarbonyloxy group, 2,2-dimethyl-n-butylcarbonyloxy group, 2,3-dimethyl-n-butylcarbonyloxy group, 3,3-dimethyl-n-butylcarbonyloxy group, 1-ethyl-n-butylcarbonyloxy group, 2-ethyl-n-butylcarbonyloxy group, 1,1,2-trimethyl-n-propylcarbonyloxy group, 1,2,2-trimethyl-n-propylcarbonyloxy group, 1-ethyl-1-methyl-n-propylcarbonyloxy group, 1-ethyl-2-methyl-n-propylcarbonyloxy group, phenylcarbonyloxy group, and tosylcarbonyloxy group.

Examples of the aforementioned halogen group include fluorine, chlorine, bromine, and iodine.

Examples of the silicon-containing compound of Formula (1) include tetramethoxysilane, tetrachlorosilane, tetraacetoxysilane, tetraethoxysilane, tetra-n-propoxysilane, tetraisopropoxysilane, tetra-n-butoxysilane, tetraacetoxysilane, methyltrimethoxysilane, methyltrichlorosilane, methyltriacetoxysilane, methyltripropoxysilane, methyltriacetyxysilane, methyltributoxysilane, methyltripropoxysilane, methyltriamyloxysilane, methyltriphenoxysilane, methyltribenzyloxysilane, methyltriphenethyloxysilane, glycidoxymethyltrimethoxysilane, glycidoxymethyltriethoxysilane, α-glycidoxyethyltrimethoxysilane, α-glycidoxyethyltriethoxysilane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltributoxysilane, γ-glycidoxypropyltriphenoxysilane, α-glycidoxybutyltrimethoxysilane, α-glycidoxybutyltriethoxysilane, β-glycidoxybutyltriethoxysilane, γ-glycidoxybutyltrimethoxysilane, γ-glycidoxybutyltriethoxysilane, δ-glycidoxybutyltrimethoxysilane, δ-glycidoxybutyltriethoxysilane, (3,4-epoxycyclohexyl)methyltrimethoxysilane, (3,4-epoxycyclohexyl)methyltriethoxysilane, β-(3,4-epoxycyclohexyl)ethyltrimethoxysilane, β-(3,4-epoxycyclohexyl)ethyltriethoxysilane, β-(3,4-epoxycyclohexyl)ethyltripropoxysilane, β-(3,4-epoxycyclohexyl)ethyltributoxysilane, β-(3,4-epoxycyclohexyl)ethyltriphenoxysilane, γ-(3,4-epoxycyclohexyl)propyltrimethoxysilane, γ-(3,4-epoxycyclohexyl)propyltriethoxysilane, δ-(3,4-epoxycyclohexyl)butyltrimethoxysilane, δ-(3,4-epoxycyclohexyl)butyltriethoxysilane, glycidoxymethylmethyldimethoxysilane, glycidoxymethylmethyldiethoxysilane, α-glycidoxyethylmethyldimethoxysilane, α-glycidoxyethylmethyldiethoxysilane, β-glycidoxyethylmethyldimethoxysilane, β-glycidoxyethylethyldimethoxysilane, α-glycidoxypropylmethyldimethoxysilane, α-glycidoxypropylmethyldiethoxysilane, β-glycidoxypropylmethyldimethoxysilane, β-glycidoxypropylethyldimethoxysilane, γ-glycidoxypropylmethyldimethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldiphenoxysilane, γ-glycidoxypropylethyldimethoxysilane, γ-glycidoxypropylethyldiethoxysilane, γ-glycidoxypropylvinyldimethoxysilane, γ-glycidoxypropylvinyldiethoxysilane, ethyltrimethoxysilane, ethyltriethoxysilane, vinyltrimethoxysilane, vinyltrichlorosilane, vinyltriacetoxysilane, vinyltriethoxysilane, vinyltriacetoxysilane, methoxyphenyltrimethoxysilane, methoxyphenyltriethoxysilane, methoxyphenyltriacetoxysilane, methoxyphenyltrichlorosilane, methoxybenzyltrimethoxysilane, methoxybenzyltriethoxysilane, methoxybenzyltriacetoxysilane, methoxybenzyltrichlorosilane, methoxyphenethyltrimethoxysilane, methoxyphenethyltriethoxysilane, methoxyphenethyltriacetoxysilane, methoxyphenethyltrichlorosilane, ethoxyphenyltrimethoxysilane, ethoxyphenyltriethoxysilane, ethoxyphenyltriacetoxysilane, ethoxyphenyltrichlorosilane, ethoxybenzyltrimethoxysilane, ethoxybenzyltriethoxysilane, ethoxybenzyltriacetoxysilane, ethoxybenzyltrichlorosilane, isopropoxyphenyltrimethoxysilane, isopropoxyphenyltriethoxysilane, isopropoxyphenyltriacetoxysilane, isopropoxyphenyltrichlorosilane, isopropoxybenzyltrimethoxysilane, isopropoxybenzyltriethoxysilane, isopropoxybenzyltriacetoxysilane, isopropoxybenzyltrichlorosilane, t-butoxyphenyltrimethoxysilane, t-butoxyphenyltriethoxysilane, t-butoxyphenyltriacetoxysilane, t-butoxyphenyltrichlorosilane, t-butoxybenzyltrimethoxysilane, t-butoxybenzyltriethoxysilane, t-butoxybenzyltriacetoxysilane, t-butoxybenzyltrichlorosilane, methoxynaphthyltrimethoxysilane, methoxynaphthyltriethoxysilane, methoxynaphthyltriacetoxysilane, methoxynaphthyltrichlorosilane, ethoxynaphthyltrimethoxysilane, ethoxynaphthyltriethoxysilane, ethoxynaphthyltriacetoxysilane, ethoxynaphthyltrichlorosilane, γ-chloropropyltrimethoxysilane, γ-chloropropyltriethoxysilane, γ-chloropropyltriacetoxysilane, 3,3,3-trifluoropropyltrimethoxysilane, γ-methacryloxypropyltrimethoxysilane, γ-mercaptopropyltrimethoxysilane, γ-mercaptopropyltriethoxysilane, β-cyanoethyltriethoxysilane, chloromethyltrimethoxysilane, chloromethyltriethoxysilane, dimethyldimethoxysilane, phenylmethyldimethoxysilane, dimethyldiethoxysilane, phenylmethyldiethoxysilane, γ-chloropropylmethyldimethoxysilane, γ-chloropropylmethyldiethoxysilane, dimethyldiacetoxysilane, γ-methacryloxypropylmethyldimethoxysilane, γ-methacryloxypropylmethyldiethoxysilane, γ-mercaptopropylmethyldimethoxysilane, γ-mercaptomethyldiethoxysilane, methylvinyldimethoxysilane, and methylvinyldiethoxysilane.

Examples of the silicon-containing compound of Formula (2) include methylenebistrimethoxysilane, methylenebistrichlorosilane, methylenebistriacetoxysilane, ethylenebistriethoxysilane, ethylenebistrichlorosilane, ethylenebistriacetoxysilane, propylenebistriethoxysilane, butylenebistrimethoxysilane, phenylenebistrimethoxysilane, phenylenebistriethoxysilane, phenylenebismethyldiethoxysilane, phenylenebismethyldimethoxysilane, naphthylenebistrimethoxysilane, bistrimethoxydisilane, bistriethoxydisilane, bisethyldiethoxydisilane, bismethyldimethoxydisilane, hexamethyldisilane, hexamethyldisilazane, and hexamethyldisiloxane.

For the hydrolysis of the hydrolyzable group; i.e., an alkoxy group, an aryloxy group, an acyloxy group, an alkoxysilyl group having a halogen group bonded to the Si atom, an aryloxysilyl group, an acyloxysilyl group, or a halogenated silyl group, 0.5 to 100 mol (preferably 1 to 10 mol) of water is used per mol of the hydrolyzable group.

A catalyst may be used for hydrolysis and condensation, and nitric acid is used as such a hydrolysis catalyst. Nitric acid may be used in combination with a metal chelate compound, an organic acid, an inorganic acid, an organic base, or an inorganic base. The amount of the hydrolysis catalyst used is 0.001 to 10 mol, preferably 0.001 to 1 mol, per mol of the hydrolyzable group.

The reaction temperature of hydrolysis and condensation is generally 20 to 80° C.

The hydrolysis may be completely or partially performed. Thus, a hydrolysate or the aforementioned silane compound (i.e., monomer) may remain in the hydrolysis condensate.

The dispersion of the present invention may be used in the form described above as a coating composition. The dispersion may contain, as an additive, silicone oil for improving leveling property, or an acrylic surfactant. Such an additive may be used in an amount of 1% by mass or less relative to the mass of the plate-like particles (C).

The coating composition may contain a metal compound for improving durability. Examples of the metal compound include zirconium chelate compounds such as zirconium tetraacetylacetonate and zirconium tributoxystearate; titanium chelate compounds; and aluminum chelate compounds. When such a metal compound is added, the amount of the metal compound is 0.0001 to 10% by mass relative to the mass of the plate-like particles (C).

The base material to which the aforementioned dispersion or coating composition is a generally used base plate, for example, a plate formed of plastic, glass, ceramic, silicon wafer, wood, or paper.

The amount of the solid content of the coating composition may be, for example, 0.1 to 30% by mass. The term "solid content" as used herein refers to all components (except for the liquid medium, for example, water or an organic solvent) contained in the coating composition.

The coating composition can be applied to a base material through spin coting, dipping, screen coating, or roll coating. In the case of spin coating, the rotation speed is set at, for example, 700 to 2,000 rpm, and the operation is performed for 5 to 50 seconds.

After application of the coating composition to a base material, the solvent can be removed at ambient pressure or under reduced pressure. In this case, heating may optionally be performed depending on the property of the base material. When the base material is formed of, for example, plastic, wood, or paper, the heating can be performed at 40 to 100° C., whereas when the base material is formed of, for example, glass, ceramic, or silicon wafer, the heating can be performed at 40 to 300° C. for optional removal of the solvent.

When the coating composition is applied to a base material, the viscosity of the coating composition can be controlled for adjustment of the thickness of a coating film. The viscosity of the coating composition can be adjusted to 1 to 1,000 mPa-s or 1 to 100 mPa-s.

The thickness of a coating film formed on a base plate from the coating composition containing the dispersoid (the plate-like particles (C)) in the dispersion can be adjusted to 1 nm to 10 m, or 5 nm to 1,000 nm, or 5 nm to 600 nm, or 5 to 500 nm.

The coating film formed on the base plate exhibits high transparency. When, for example, the coating film has a thickness of 500 nm, the resultant transparent substrate exhibits a total light transmittance of 80% or more, generally 90% or more.

When, for example, the total light transmittance of a base plate before formation of a coating film is taken as 100, the percent reduction in the total light transmittance of the base plate after formation of a coating film from the coating composition of the present invention can be controlled to less than 20%, or even less than 10%.

In the present invention, the aforementioned coating film can be used as a gas barrier film. Thus, the present invention can provide a gas barrier film formed of the coating film. The gas barrier film can block a gas detrimental to the base material, for example, water vapor, active oxygen, or sulfur-containing gas. For example, a gas barrier film for blocking water vapor can be formed.

The present invention is also directed to a production method for the aforementioned dispersion. The production method includes the following steps (a) to (e):

a step (a) of producing an aqueous dispersion of a layered compound (D);

a step (b) of adding quaternary ammonium ions (A) each having a total carbon atom number of 15 to 45 and one or two $C_{10\text{-}20}$ alkyl groups to the aqueous dispersion produced in the step (a) in an amount corresponding to one to three times the ion-exchange capacity of the layered compound (D), and heating the resultant mixture at 40 to 90° C. for 12 to 48 hours;

a step (c) of adding pure water to the liquid prepared in the step (b), and removing a sodium-ion-containing liquid to the outside of the system so as to achieve a sodium ion concentration of 100 ppm or less in the liquid;

a step (d) of drying the liquid prepared in the step (c), dispersing the dried powder in an aqueous solution of an anionic surfactant (B) having an ammonium ion at a concentration of 0.01 to 1% by mass, and adding ammonia to the resultant dispersion so as to adjust the pH of the dispersion to 9.0 to 12.0; and a step (e) of heating the liquid prepared in the step (d) at 40 to 90° C. for 12 to 48 hours, to thereby produce a dispersion.

The step (a) will now be described by taking as an example the case where the layered compound (D) used in the step is ilerite. Ilerite is a layered compound that is not naturally present, and can be synthesized by, for example, hydrothermal reaction of an aqueous solution of a silicic acid compound at 90 to 150° C. Examples of the silicic acid compound include silicates such as sodium silicate and potassium silicate. The aforementioned aqueous solution of a silicic acid compound is preferably an aqueous sodium silicate solution wherein the ratio by mole of $SiO_2/M_2O$ (wherein M is Na or K) is 3.5 to 4.0, and the concentration of the compound is about 10 to 30% by mass. The hydrothermal reaction condition is 90 to 150° C., particularly preferably 90 to 130° C. Ilerite can be synthesized by allowing the aqueous solution to stand still under heating for one day to 24 days or one day to 12 days.

The solid substance prepared through the hydrothermal reaction can be separated and washed with water, and then dried to thereby recover ilerite. Although the aqueous solution may be stirred at an early stage of the hydrothermal reaction for uniformizing the reaction system, the aqueous solution is preferably allowed to stand still under heating for particle growth of ilerite.

Fine ilerite can be synthesized by adding ilerite itself in the form of fine seed crystals (seed particles) into an aqueous sodium silicate solution.

In a preferred embodiment, the step (a) may be a step (a1) of adding, to an aqueous silicate solution, a pulverized layered compound (D1) in the form of seed particles prepared through pulverization of the layered compound (D), and subjecting the resultant mixture to hydrothermal treatment at 90 to 130° C. for six to 72 hours, to thereby produce an aqueous dispersion containing a fine layered compound (D2) at a concentration of 30% by mass or less.

In the step (a1), unreacted sodium silicate is removed from the medium of the hydrothermal reaction, the powder of the fine layered compound (D2) dried at, for example, 40° C. is dissolved in the medium at a concentration of 30% by mass or less, and the resultant dispersion can be used as the aqueous dispersion of the layered compound (D) in the step (a).

Preferably, the pulverized layered compound (D1) has a particle diameter of 30 to 60 nm as measured by dynamic light scattering, and a degree of crystallization of 5 to 15% as determined through powder X-ray diffractometry by the formula [(the sum of the integrated intensities of diffraction peaks at 2θ=6.9 to 8.4°)/(the sum of the integrated intensities of diffraction peaks at 2θ=5 to 40°)]×100.

The (fine) layered compound (in particular, ilerite) (D2) prepared through addition of seed crystals (seed particles) and hydrothermal reaction has an average major-axis length of 250 to 750 nm, an average minor-axis length of 200 to 550 nm, and a ratio of average major-axis length to average minor-axis length of 1.0 to 2.0. The average major-axis length and the average minor-axis length can be measured through observation with a transmission electron microscope.

The average particle diameter of the layered compound (D2) as measured by dynamic light scattering may be 100 nm to 600 nm, and is preferably 200 nm to 400 nm.

The layered compound (D) (in particular, ilerite) used in the form of seed crystals (seed particles) is produced through hydrothermal reaction of the aforementioned aqueous silicate solution or a suspension prepared by addition of the non-pulverized or pulverized layered compound (D) in the form of seed crystals (seed particles) into the aqueous silicate solution, wherein the aqueous silicate solution or the suspension is allowed to stand still at 90 to 150° C. (particularly at 90 to 130° C.) for one day to 24 days, in particular, at 110° C. for about one day to 12 days. No limitation is imposed on the particle diameter of seed crystals added into the aqueous silicate solution for the production of the layered compound (D) used in the form of seed crystals (seed particles), and the seed crystals are preferably added in an amount of 0.1 to 10% by mass, or 0.1 to 5% by mass, or 0.1 to 2% by mass relative to the silicate.

The layered compound (D1) (ilerite (D1) in this embodiment) in the form of fine seed crystals can be prepared through pulverization of the layered compound (D) (ilerite (D) in this embodiment). The hydrothermal synthesis of ilerite in the form of seed crystals can produce a fine layered compound (ilerite) (D2). The pulverization can be performed with, for example, a ball mill.

The pulverization is performed with, for example, a planetary ball mill. In the planetary ball mill, the pulverization can be performed by rotation and revolution of a container containing hard balls (e.g., zirconia balls) and ilerite. The pulverization with the planetary ball mill can be performed in two stages (specifically, preliminary pulverization and subsequent fine pulverization), to thereby prepare ilerite (D1) in the form of seed crystals. The pulverization may be performed in a wet or dry process, but is preferably performed in a dry process.

The aforementioned ilerite used in the form of seed crystals may be separately obtained ilerite. Alternatively, the ilerite may be produced through a continuous batch process by addition of a portion of the previous batch or by use of the residue in a reaction container.

The step (b) involves adding quaternary ammonium ions (A) each having a total carbon atom number of 15 to 45 and one or two $C_{10-20}$ alkyl groups to the aqueous dispersion of the layered compound (D) produced in the step (a) in an amount corresponding to one to three times the ion-exchange capacity of the layered compound (D), and heating the resultant mixture at 40 to 90° C. for 12 to 48 hours.

The step (c) involves adding pure water to the liquid prepared in the step (b), and removing a sodium-ion-containing liquid to the outside of the system so as to achieve a sodium ion concentration of 100 ppm or less in the liquid. In the step (b), sodium ions present between layers of the layered compound (D) are replaced with quaternary ammonium ions, and sodium ions released in the liquid are removed to the outside of the system. Thus, re-replacement with sodium ions are prevented, and the interlayer spaces are expanded with quaternary ammonium ions, to thereby achieve interlayer exfoliation of the layered compound. Examples of the method for removing sodium ions include ultrafiltration and decantation.

The step (d) involves drying the liquid prepared in the step (c), dispersing the dried powder in an aqueous solution of an anionic surfactant (B) having an ammonium ion at a concentration of 0.01 to 1% by mass, and adding ammonia to the resultant dispersion so as to adjust the pH of the dispersion to 9.0 to 12.0. When the anionic surfactant (B) having an ammonium ion is added, exfoliated layer substances generated through interlayer exfoliation are coated with the anionic surfactant, or the anionic surfactant intervenes between the exfoliated layer substances, to thereby prevent re-formation of a layered compound from exfoliated layer substances generated through interlayer exfoliation in the subsequent step (e). In the step (d), the pH can be adjusted to 9.0 to 12.0 with ammonia.

The step (d) may be performed under ultrasonic irradiation for sufficient coating of the surface of ilerite with the anionic surfactant (B) having an ammonium ion.

The step (e) involves heating the liquid prepared in the step (d) at 40 to 90° C. for 12 to 48 hours.

The production method may further include a step (f) of replacing the solvent of the resultant aqueous dispersion with an organic solvent after the step (e). This step produces a dispersion (sol) wherein plate-like particles prepared from ilerite through interlayer exfoliation are dispersed in an organic solvent.

The thus-produced dispersion of the present invention exhibits high dispersibility, and high dispersion stability (for example, no precipitation occurs even after the elapse of six months at room temperature).

In the present invention, the aforementioned dispersion can be used as a coating composition. For preparation of the coating composition, the pH of the composition can be adjusted to 7 to 12, or 7 to 11, or 9 to 12, or 9 to 11.

Examples of the article to which the coating composition of the present invention is applied include a display, an LCD surface, an optical lens, an eyeglass lens, a surface base material for a solar battery, a cellular phone, an organic EL emission member, an illumination lamp, a windowpane for construction, an agricultural film, and a transparent member for a vehicle.

EXAMPLES

The present invention will next be described in detail by way of Examples, but the present invention should not be construed as being limited to the Examples.
(Evaluation Method)

Dynamic light scattering: measured with Zetasizer Nano S (trade name) available from Spectris Co., Ltd.

Degree of crystallization: the degree of crystallization was calculated from data obtained with a powder X-ray diffractometer XRD-6100 available from Shimadzu Corporation by using the formula [(the sum of the integrated intensities of diffraction peaks at $2\theta=6.9$ to $8.4°$)/(the sum of the integrated intensities of diffraction peaks at $2\theta=5$ to $40°$)]×100.

Absorbance: measured with an ultraviolet-visible near-infrared spectrophotometer UV-3600 Plus (trade name) available from Shimadzu Corporation.

Transmission electron microscope: JEM-1010 (trade name) available from JEOL Ltd. was used.

Average minor-axis length and average major-axis length: a transmission electron microscope JEM-1010 available from JEOL Ltd. was used, and 200 particles were analyzed with an image analyzer.

Transmittance of base plate: the total light transmittance of a base plate was measured with a haze meter NDH 5000 (trade name) available from NIPPON DENSHOKU INDUSTRIES CO., LTD.

Average thickness: measured in a contact mode with AFM (atomic force microscope) SPM-9500J3 (trade name) available from Shimadzu Corporation. The cantilever (probe) used was silicon nitride (trade name: OMCL-TR800PSA-1) available from Olympus Corporation.

Synthesis Example 1: Synthesis of Ilerite

A stainless steel (SUS304)-made hermetic container was charged with 50 mL of No. 4 water glass (available form NIPPON CHEMICAL INDUSTRIAL CO., LTD., the proportions by mole of $SiO_2:Na_2O:H_2O=3.9:1:39.0$, $SiO_2$ concentration: 23.44% by mass, $Na_2O$ concentration: 6.29% by mass), and the container was allowed to stand still under heating at 110° C. for 12 days, to thereby hydrothermally synthesize ilerite. The resultant product was identified as ilerite by XRD (PDF card No. 00-048-0655).

Subsequently, 2 g of the resultant ilerite and 73 g of zirconia-made pulverizing balls having a diameter of 5 mm were added to a silicon nitride-made container (volume: 45 mL) of a planetary ball mill (trade name: P-7 type, available from Fritsch), and dry pulverization was performed in an air atmosphere at a rotation speed of 220 rpm for one hour. Thereafter, the pulverizing balls having a diameter of 5 mm were replaced with 73 g of zirconia-made pulverizing balls having a diameter of 3 mm, and then dry pulverization was performed in an air atmosphere at a rotation speed of 300 rpm for one hour (the resultant pulverized particles were found to have a particle diameter of 41 nm as measured by dynamic light scattering and a degree of crystallization of 10.6%).

Subsequently, 0.32 g of the resultant pulverized ilerite particles, serving as seed crystals (seed particles), were added to 50 mL of No. 4 water glass. The resultant mixture was placed in a SUS304-made hermetic container, and the container was allowed to stand still under heating at 110° C. for 12 hours, to thereby yield ilerite nanoparticles having a number median diameter of 250 nm as measured by dynamic light scattering. The resultant ilerite was found to have a major-axis length of 456 nm, a minor-axis length of 396 nm, and a ratio of major-axis length to minor-axis length of 1.2. FIG. 1 shows a transmission electron microscope photograph of the resultant ilerite (magnification: 100,000). The resultant product was identified as ilerite by XRD (PDF card No. 00-048-0655).

Example 1: Production of Nanosheet Dispersion, and Production of Transparent Substrate Firstly, 0.3 g of the ilerite nanoparticles prepared in Synthesis Example 1 and 0.73 g of dimethyldioctadecylammonium chloride were added to 30 g of water, and the resultant mixture was allowed to stand still under heating at 80° C. for 20 hours, to thereby replace sodium ions between silicate layers of the ilerite with dimethyldioctadecylammonium ions (dimethyldioctadecylammonium ion concentration: 2.2% by mass). The Na ions were removed to the outside of the system through ultrafiltration, and then the resultant product was dried at 80° C., to thereby yield ion-exchanged ilerite powder (the ion-exchanged ilerite powder was found to have an Na ion concentration of 605 ppm).

Subsequently, 0.03 g of the ion-exchanged ilerite powder was added to a 0.5% by mass ammonium dodecyl sulfate solution so that the total mass was 30 g (the absorbance of the resultant liquid was 2.334 at an ion-exchanged ilerite concentration of 0.1% by mass, an optical path length of 1 cm, and a wavelength of 620 nm). Aqueous ammonia was added to the liquid to thereby achieve a pH of 9 or more (the absorbance of the resultant liquid was 0.120 at an ion-exchanged ilerite concentration of 0.1% by mass, an optical path length of 1 cm, and a wavelength of 620 nm). The resultant solution was allowed to stand still under heating at 60° C. for 24 hours, to thereby yield a colloidal solution containing ilerite nanosheets (plate-like particles) obtained through interlayer exfoliation of the ilerite nanoparticles (the resultant dispersion was found to have an Na concentration of 0.6 ppm, an ammonium dodecyl sulfate concentration of 0.5% by mass, and a dimethyldioctadecylammonium ion concentration of 0.06% by mass).

Figure 2:
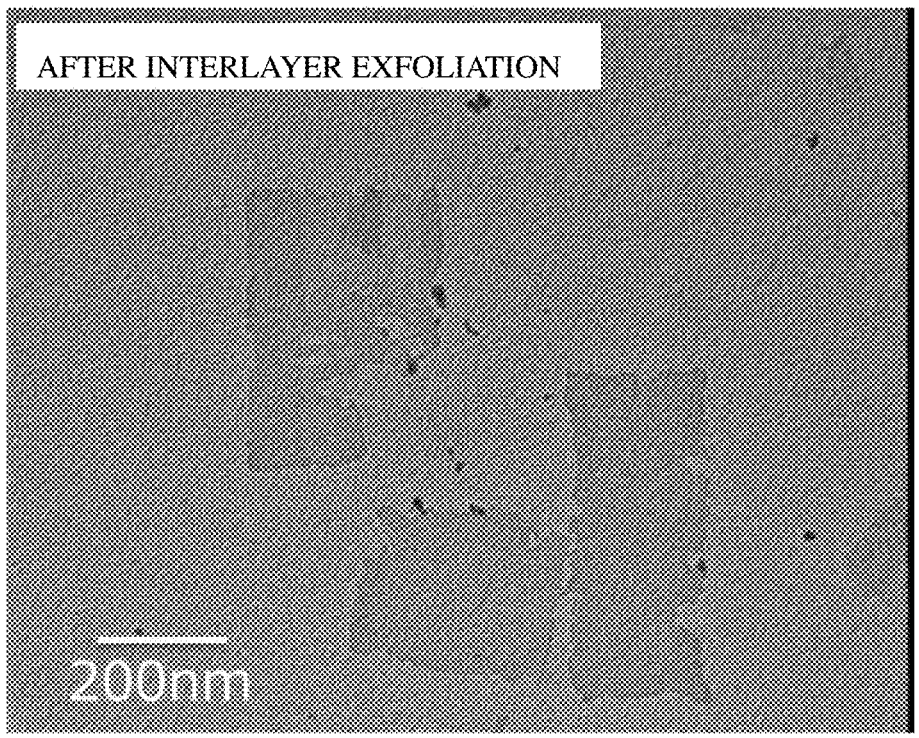
FIG. 2 shows a transmission electron microscope photograph (magnification: 100,000) of nanosheets (plate-like particles) prepared through interlayer exfoliation of ilerite nanoparticles in Example 1.

The resultant plate-like particles were found to have an average major-axis length of 302 nm, an average minor-axis length of 233 nm, a ratio of average major-axis length to average minor-axis length of 1.3, an average particle diameter of 34.3 nm as measured by dynamic light scattering, and an average thickness of 1.1 nm. The resultant dispersion exhibited an absorbance of 0.007 at an ion-exchanged ilerite concentration of 0.1% by mass, an optical path length of 1 cm, and a wavelength of 620 nm. FIG. 2 shows a transmission electron microscope photograph of the resultant plate-like particles (magnification: 100,000).

The dispersion was applied onto a PET (polyethylene terephthalate) base plate and then dried at 100° C. to form a coating film, whereby a transparent substrate was formed. The resultant transparent substrate was found to have a thickness of 600 nm and a total light transmittance of 92.8%.

Comparative Example 1

The operation was performed in the same manner as in Example 1, except that ammonium dodecyl sulfate was not added.

The finally produced dispersion exhibited an absorbance of 1.602 at an ion-exchanged ilerite concentration of 0.1% by mass, an optical path length of 1 cm, and a wavelength of 620 nm.

Comparative Example 2

The operation was performed in the same manner as in Example 1, except that ammonium dodecyl sulfate was replaced with an equal amount of sodium dodecyl sulfate. The finally produced dispersion exhibited an absorbance of 0.020 at an ion-exchanged ilerite concentration of 0.1% by mass, an optical path length of 1 cm, and a wavelength of 620 nm.

Comparative Example 3

The operation was performed in the same manner as in Example 1, except that ammonium dodecyl sulfate was replaced with an equal amount of potassium laurate. The finally produced dispersion exhibited an absorbance of 2.703 at an ion-exchanged ilerite concentration of 0.1% by mass, an optical path length of 1 cm, and a wavelength of 620 nm.

As shown in Example 1, the dispersion of the present invention (i.e., ilerite dispersion) containing the anionic surfactant (B) having an ammonium ion exhibited high transparency and maintained high dispersibility; i.e., exfoliated layer substances were sufficiently stably dispersed in the liquid medium. The coating film formed from the dispersion achieved the production of a transparent substrate having high transparency.

In contrast, the transparency of the dispersion was reduced in Comparative Example 1 wherein the anionic surfactant (B) having an ammonium ion was not added, in Comparative Example 2 wherein an anionic surfactant having a sodium ion instead of an ammonium ion was used, or in Comparative Example 3 wherein an anionic surfactant having a potassium ion was used. The results of these Comparative Examples suggested that the interlayer exfoliation of the layered compound did not proceed in the reaction system, or exfoliated layer substances generated through interlayer exfoliation re-formed a layered structure.

The invention claimed is:

1. A dispersion comprising quaternary ammonium ions (A) each having a total carbon atom number of 15 to 45 and one or two $C_{10\text{-}20}$ alkyl groups, and an anionic surfactant (B) having an ammonium ion, wherein plate-like particles (C) having an average thickness of 0.7 to 40 nm, an average major-axis length of 100 to 600 nm, an average minor-axis length of 50 to 300 nm, and a ratio of average major-axis length to average minor-axis length of 1.0 to 10.0 are dispersed in a liquid medium, and the plate-like particles (C) in the dispersion have an average particle diameter of 10 to 600 nm as measured by dynamic light scattering.

2. The dispersion according to claim 1, wherein the plate-like particles (C) are exfoliated layer substances prepared through interlayer exfoliation of a layered compound (D).

3. The dispersion according to claim 2, wherein the layered compound (D) is ilerite.

4. The dispersion according to claim 1, wherein the plate-like particles (C) have an Na ion concentration of 0.2% by mass or less.

5. The dispersion according to claim 1, wherein the dispersion has an Na ion concentration of 100 ppm or less.

6. The dispersion according to claim 1, wherein the concentration of the quaternary ammonium ions (A) in the dispersion is 10% by mass or less.

7. The dispersion according to claim 1, wherein the concentration of the anionic surfactant (B) having an ammonium ion in the dispersion is 0.01 to 1% by mass.

8. The dispersion according to claim 1, wherein the anionic surfactant (B) having an ammonium ion is ammonium dodecyl sulfate.

9. The dispersion according to claim 1, wherein the concentration of the plate-like particles (C) in the dispersion is 30% by mass or less.

10. The dispersion according to claim 1, wherein the dispersion exhibits an absorbance of 0.015 or less at an optical path length of 1 cm and a wavelength of 620 nm when the concentration of the plate-like particles (C) is 0.1% by mass.

11. A coating composition comprising the dispersion according to claim 1.

12. A coating film comprising the plate-like particles (C) contained in the dispersion according to claim 1.

13. A transparent substrate comprising a base plate and the coating film according to claim 12 disposed on the base plate, wherein the transparent substrate exhibits a total light transmittance of 80% or more when the coating film has a thickness of 500 nm.

14. A method for producing the dispersion according to claim 1, the method comprising the following steps (a) to (e):

a step (a) of producing an aqueous dispersion of a layered compound (D);

a step (b) of adding quaternary ammonium ions (A) each having a total carbon atom number of 15 to 45 and one or two $C_{10-20}$ alkyl groups to the aqueous dispersion produced in the step (a) in an amount corresponding to one to three times the ion-exchange capacity of the layered compound (D), and heating the resultant mixture at 40 to 90° C. for 12 to 48 hours;

a step (c) of adding pure water to the liquid prepared in the step (b), and removing a sodium-ion-containing liquid to the outside of the system so as to achieve a sodium ion concentration of 100 ppm or less in the liquid;

a step (d) of drying the liquid prepared in the step (c), dispersing the dried powder in an aqueous solution of an anionic surfactant (B) having an ammonium ion at a concentration of 0.01 to 1% by mass, and adding ammonia to the resultant dispersion so as to adjust the pH of the dispersion to 9.0 to 12.0; and a step (e) of heating the liquid prepared in the step (d) at 40 to 90° C. for 12 to 48 hours, to thereby produce a dispersion.

15. The method for producing the dispersion of the layered compound (D) according to claim 14, wherein the step (a) is a step (a1) of adding, to an aqueous silicate solution, a pulverized layered compound (D1) in the form of seed particles prepared through pulverization of the layered compound (D), and subjecting the resultant mixture to hydrothermal treatment at 90 to 130° C. for six to 72 hours, to thereby produce an aqueous dispersion containing a fine layered compound (D2) at a concentration of 30% by mass or less.

16. The production method according to claim 15, wherein the pulverized layered compound (D1) has a particle diameter of 30 to 60 nm as measured by dynamic light scattering, and a degree of crystallization of 5 to 15% as determined through powder X-ray diffractometry by the formula [(the sum of the integrated intensities of diffraction peaks at 2θ=6.9 to 8.4°)/(the sum of the integrated intensities of diffraction peaks at 2θ=5 to 40°)]×100.

17. The production method according to claim 15, wherein the fine layered compound (D2) has an average major-axis length of 250 to 750 nm, an average minor-axis length of 200 to 550 nm, and a ratio of average major-axis length to average minor-axis length of 1.0 to 2.0.

18. The method for producing the dispersion according to claim 15, wherein the pulverization of the layered compound (D) in the step (a1) is performed in a dry process with a planetary ball mill.

19. The method for producing the dispersion according to claim 14, wherein the method further comprises a step (f) of replacing the solvent of the produced dispersion with an organic solvent after the step (e).

20. A method for producing the transparent substrate according to claim 13, the method comprising applying the dispersion to a base plate, and heating the base plate at 40 to 300° C.

* * * * *